United States Patent [19]

Britz et al.

[11] Patent Number: 5,236,090
[45] Date of Patent: Aug. 17, 1993

[54] FLOTATION-DEINKING-DEVICE

[75] Inventors: Herbert Britz, Constance; Erich Linck, Weingarten, both of Fed. Rep. of Germany

[73] Assignee: Sulzer-Escher Wyss GmbH, Ravensburg, Fed. Rep. of Germany

[21] Appl. No.: 931,905

[22] Filed: Aug. 18, 1992

Related U.S. Application Data

[63] Continuation of Ser. No. 706,031, May 28, 1991, abandoned.

[30] Foreign Application Priority Data

May 30, 1990 [DE] Fed. Rep. of Germany ....... 4017446

[51] Int. Cl.$^5$ ..................... B03D 1/24; B01D 17/035; B01F 3/04; B21C 5/02
[52] U.S. Cl. .................................. 209/170; 261/36.1; 261/DIG. 75; 162/4; 210/199; 210/221.1; 210/221.2
[58] Field of Search .............. 162/4; 210/221.1, 221.2, 210/199; 209/170; 261/36.1, DIG. 75

[56] References Cited

U.S. PATENT DOCUMENTS

| | | | |
|---|---|---|---|
| 2,938,629 | 5/1960 | Hollingsworth | 209/170 |
| 4,186,094 | 1/1980 | Hellberg | 209/170 |
| 4,190,522 | 2/1980 | Tra | 209/170 |
| 4,331,534 | 5/1982 | Barnscheidt | 162/4 |
| 4,512,888 | 4/1985 | Flynn | 209/170 |
| 4,548,673 | 10/1985 | Nanda | 162/4 |
| 4,560,474 | 12/1985 | Holik | 209/170 |
| 4,620,926 | 11/1986 | Linck | 209/170 |
| 4,721,562 | 1/1988 | Barnscheidt | 209/170 |
| 4,738,784 | 4/1988 | Sugihara | 209/170 |
| 4,790,944 | 12/1988 | Gordon | 209/170 |
| 4,842,777 | 6/1989 | Lamort | 209/170 |

FOREIGN PATENT DOCUMENTS

| | | | |
|---|---|---|---|
| 3529638 | 7/1986 | Fed. Rep. of Germany | 209/170 |
| 0282492 | 12/1986 | Japan | 209/170 |

*Primary Examiner*—Thomas M. Lithgow
*Attorney, Agent, or Firm*—Wolf, Greenfield & Sacks

[57] ABSTRACT

The invention relates to a flotation-deinking-device comprising a flotation vessel and at least one inlet for introducing the suspension into the flotation vessel, the inlet being a staged diffusor (12) in which in a region of the stage transition (26) an air inlet opening (20) is arranged. A turbulence generator (28) without an air supply is arranged upstream of the stage transition (26) as seen in the direction of flow.

6 Claims, 2 Drawing Sheets

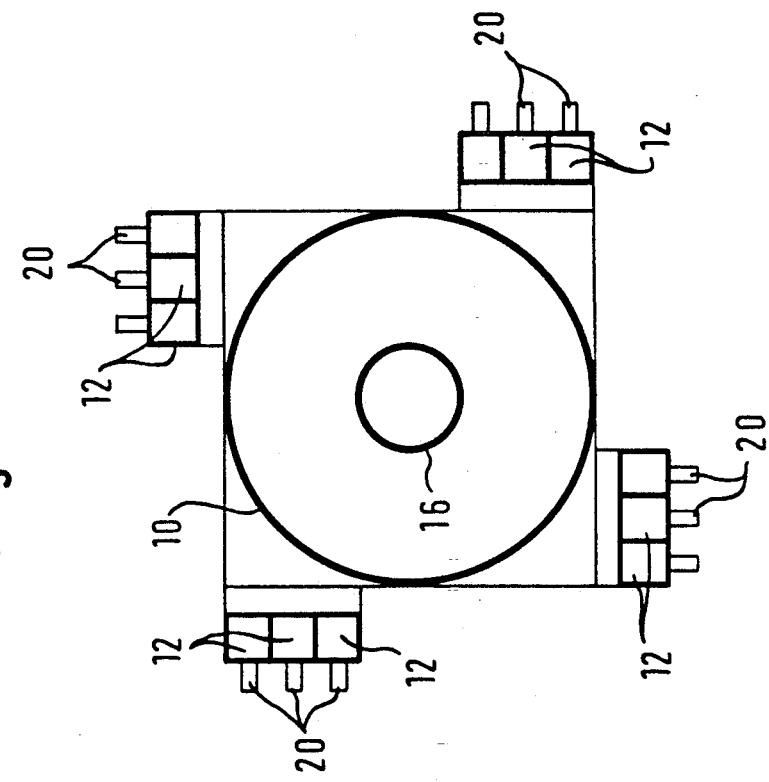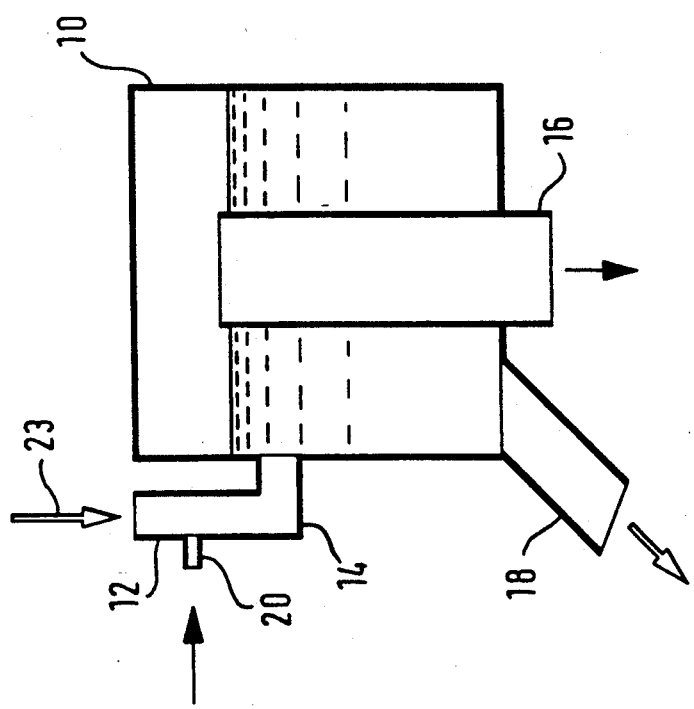

FLOTATION-DEINKING-DEVICE

This application is a continuation of application Ser. No. 07/706,031, filed May 28, 1991, (now abandoned).

BACKGROUND OF THE INVENTION

The invention relates to a flotation-deinking-device comprising a flotation vessel and at least one inlet for introducing the suspension into the flotation vessel, the flotation vessel being arranged as a staged diffusor in which in the area of the stage transition an air inlet opening is arranged, an accept outlet and an outlet for the froth carrying the attached colour particles. Here, a stage transition means a right-angled stage transition.

Such a flotation-deinking-device is known from DE-OS 35 29 638. In this, a two-staged diffusor for introducing the suspension is described in which air is drawn in either at the stage transition located upstream in the direction of flow or at both stage transitions in order to mix the air into the suspension so that small air bubbles are formed as a result of a turbulent flow to which colour particles in the suspension are able to attach themselves.

Flotation cells are already known in which the suspension-air mixture is tangentially introduced in a horizontal direction into a circular-cylindrical flotation vessel. The air bubbles formed in the diffusor to which the coloured particles have attached themselves swim as a froth in this flotation container up to the surface of the suspension in the flotation vessel. Here, the froth then flows over into a central outlet. At the base of the flotation vessel, the suspension separated from the colour particles is withdrawn as accept.

It is an object of the invention to provide a flotation-deinking-device with which colour particles of a particle size in the range of ca. 60 um to several 100 u in diameter can be separated from the suspension while maintaining a good efficiency.

SUMMARY OF THE INVENTION

This object is solved in accordance with the invention in that a turbulence generator without air feed is arranged upstream of the stage transition as seen in the direction of flow.

On account of the upstream arrangement of the turbulence generator, the possibility arises to arrange the flotation-deinking-device in such a manner that a sufficiently large number of larger air bubbles can be generated downstream of the stage transition to which the mentioned larger colour particles can better attach themselves with good efficiency and in fact substantially independently of the particle size in the mentioned range.

As a particularly simple variant of the turbulence generator, a further stage transition within the staged diffusor can be utilized. The diameter enlargement of this stage transition preferably amounts to at least 3 mm.

A further improvement of the solution of the object according to claim 1 results from the cross sections above and below the stage progression being dimensioned such that a reduction in the suspension flow velocity of at least 3 m/s. can ensue.

Apart from a stage transition, the turbulence generator can also be formed by a narrowing of the flow cross section, which leads to turbulence, as well as by a static mixer, the components of which lead to turbulence.

In accordance with an advantageous development the staged diffusor can be arranged vertically and open horizontally into the flotation vessel via a deflector. This deflector leads to an additional mixing of the suspension with the air before the introduction of the mixture into the flotation vessel, thus enhancing the attachment of the colour particles.

On account of the stage diffusor opening tangentially into the flotation vessel, a rotational movement of the suspension in the flotation vessel is caused in the flotation vessel resulting in a better central withdrawal of the colour particle carrying froth which swims towards the surface of the suspension.

In order that the air bubbles laiden with dirt particles can escape along the shortest path within the flotation vessel towards the top of and out of the suspension, the staged diffusor preferably opens directly beneath the suspension surface formed in the flotation vessel. The range of 0 to 500 mm, preferably 50 to 250 mm has proven to be an advantageous dimension of the distance between the upper edge of the staged diffusor and the suspension surface.

This is particularly important for the separation of large colour particles. Large particles in fact present the surrounding suspension with a large attachement surface. They therefore tend more strongly to remain hanging in the elastic network of the fibers in the fiber suspension and to be torn off. Additionally, the forces of the surrounding suspension flow can also lead to tearing away.

Usefully, several staged diffusors can be arranged adjacent one another.

BRIEF DESCRIPTION OF THE DRAWINGS

The invention is described in more detail in the following on the basis of purely schematic exemplified embodiments shown in the drawings, in which:

FIG. 1 shows a schematic longitudinal cross sectional view of a flotation-deinking-device, FIG. 2 shows a plan view of the device according to FIG. 1.

DESCRIPTION OF THE PREFERRED EMBODIMENTS

Figure 3:
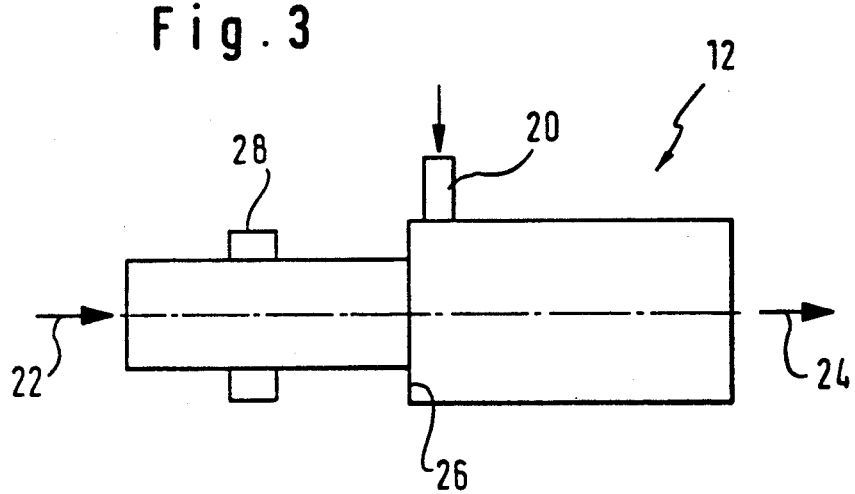
FIG. 3 shows a schematic depiction of a staged diffusor.

The flotation-deinking-device depicted in FIG. 1 comprises a flotation vessel 10 having an inlet for the grey stock or the fiber suspension which is still mixed with colour particles. This opening is formed as a staged diffusor 12 even if this cannot be recognized from FIG. 1. This staged diffusor 12 is arranged vertically and enters horizontally via a deflector 14 in the shown manner into the flotation vessel 10, although this is naturally also conceivable at an angle other than an angle of 90° to the vertical. As can be seen from FIG. 2, several inlets, in this case three, are arranged adjacent to one another in such a manner that these enter tangentially into the circular-cylindrical flotation vessel 10.

As can be see from FIG. 1, the inlet opens into the flotation vessel 10 closely beneath the suspension surface formed in the flotation vessel 10.

A froth withdrawl pipe 16 is located centrally in the middle of the flotation vessel and an accept withdrawal pipe 18 is arranged in the bottom of the flotation vessel 10 radially outside the froth withdrawal pipe 16.

An air inlet 20 is located laterally to the side of the inlet.

Figure 4:
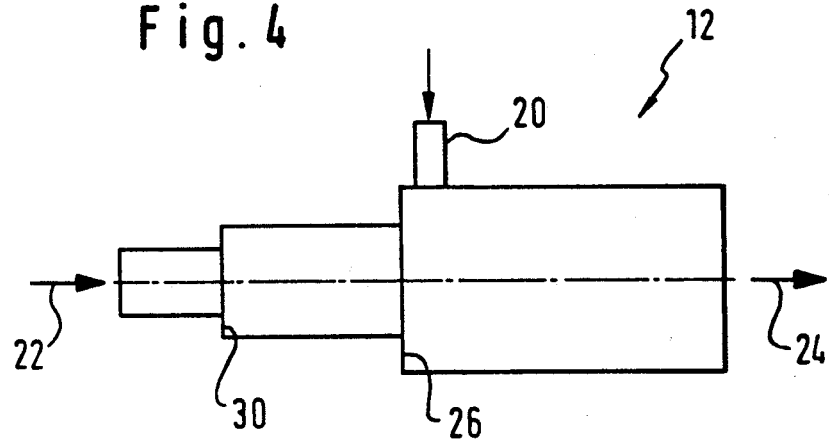
FIG. 4 shows a schematic depiction of a somewhat altered staged diffusor.

The construction of the staged diffusor 12 can be seen schematically in FIGS. 3 and 4. The direction of flow through the staged diffusor is shown by means of the arrows 22 and 24. The air inlet 20 is located in the region of the stage transition 26, i.e. the location at which the flow cross section is widened. A turbulence generator 28 only indicated schematically in FIG. 3 is arranged upstream of the stage transition 26 in the direction of flow. In FIG. 4, this turbulence generator is formed by an upstream stage transition 30.

In the following, the mode of operation of the device is described.

The grey stock or the fiber suspension which is still mixed with the colour particles is introduced into the staged diffusor 12 in accordance with the arrow 23. In the region of the turbulence generator, a turbulence is formed in the suspension flow. By means of this turbulence formation, the suspension flow enters into the region of the stage transition 26 where, on account of a suction effect, air is introduced into the suspension flow in order to generate a sufficient number of and sufficiently large air bubbles to which colour particles of the size of up to several 100 um in diameter in the suspension can attach themselves during the mixing of the air with the suspension.

The suspension-air mixture is then tangentially introduced into the flotation vessel 10 with the result that the air bubbles with the attached colour particles swim up to the surface along the shortest path and then overflow into the froth withdrawal pipe 16. This overflowing process in the center of the flotation vessel is enhanced by the rotational flow within the flotation vessel. The accept substantially cleaned of colour particles is withdrawn at the bottom of the flotation vessel via the withdrawal pipe 18.

We claim:

1. In a flotation deinking device comprising a flotation vessel having at least one inlet means for introducing suspension to the flotation vessel, the inlet means including a diffusor for generating deinking froth, the flotation vessel further including a suspension outlet means for removing deinked suspension from the flotation vessel and a froth outlet means for transferring froth carrying ink particles from the flotation vessel, the improvement comprising:

the diffusor including first, second and third sections positioned from upstream to downstream in a flow direction of the diffusor and the sections being positioned along a line in the flow direction each of the sections having respective first, second and third cross-sectional areas with step transitions therebetween to generate turbulent flow, each of the cross-sectional areas in a downstream direction being greater than a preceding upstream cross-sectional area and the third section being positioned to receive turbulent flow from the step transition between the third section and the second section and the second section being positioned to receive turbulent flow from the step transition between the second section and the first section; and a single air feed means positioned in the third section proximate the step transition between the second section and the third section for forming froth in the suspension, each of the first and second sections being free of any air feed means, whereby the froth includes large deinking bubbles therein.

2. A flotation deinking device as set forth in claim 1 wherein the step transition between the first section and the second section is at least 3 mm.

3. A flotation deinking device as set forth in claim 1 wherein the diffusor is positioned vertically and includes a deflector to direct suspension flow into the flotation vessel in a substantially horizontal direction.

4. A flotation deinking device as set forth in claim 1 wherein the diffusor includes means for outputting suspension into the flotation vessel positioned directly below a surface of the suspension within the flotation vessel.

5. A flotation deinking device as set forth in claim 1 wherein the diffusor includes means for directing a tangential flow of suspension into the flotation vessel.

6. A flotation deinking device as set forth in claim 5 wherein the flotation vessel comprises a plurality of diffusors having the first, second and third section positioned adjacent each other.

* * * * *